3,164,979
PNEUMATIC OR GAS PRESSURE CONTROL APPARATUS
Samuel A. Siegel, 5392 Janisann Ave., Culver City, Calif.
Filed Sept. 24, 1962, Ser. No. 225,496
2 Claims. (Cl. 73—4)

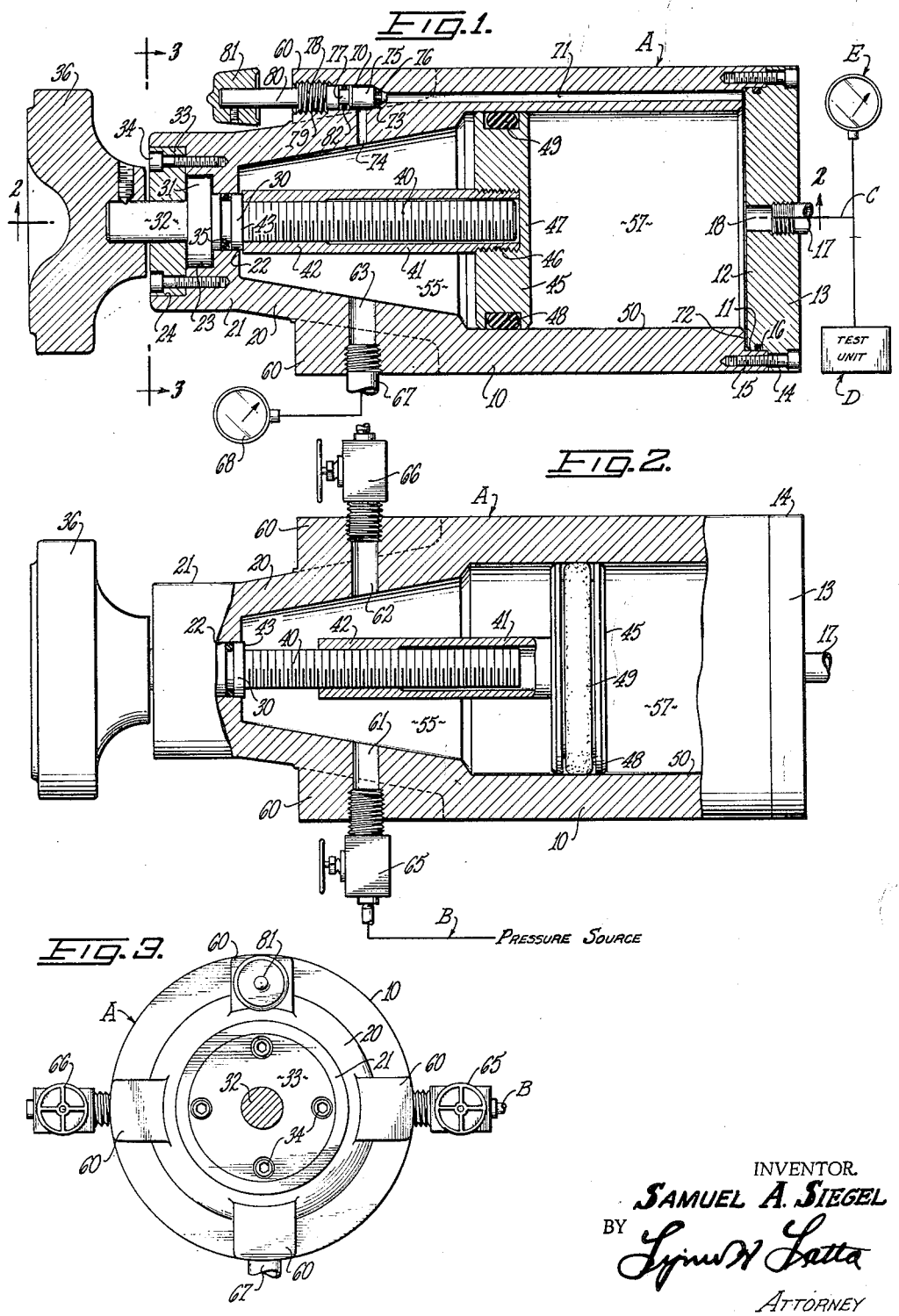

This invention relates to apparatus for controlling pneumatic pressures, either air or gas (e.g. pneumatic pressure in a pressure sensitive instrument which is required to respond to a pre-set pressure in order to provide a control or indicator function); and has as its general object to provide an improved testing device for imposing upon the instrument to be tested, the exact pressure for which it is to be pre-set.

In general, the device provides a means for manually adjusting the pressure of a gas (e.g. air) in a control chamber of the device into which the gas is introduced under pressure from any suitable pressurizing source which provides the gas at approximately the desired pressure. The device provides a means for sealing the control chamber from the pressurizing source, then adjusting the pressure in the control chamber to the exact preselected pressure for which the instrument is to be tested. From the control chamber the pressurized gas is delivered to a pressure line leading to the instrument to be tested, and the pressure therein is read upon a gage connected to this pressure line in parallel with the instrument. The manual adjustment of pressure in the control chamber is continued while reading this pressure on the gage, until the exact preselected pressure is achieved. The response of the instrument is then adjusted to this pressure. The device provides means for then releasing the pressurized gas from its control chamber preparatory to unhooking the instrument that has just been tested and hooking up another instrument to the pressure line of the testing system. With the next instrument thus connected in the system, the process may be repeated, the device being actuated to admit a fresh charge of pressurized gas from the pressurizing source.

The general object of the present invention is to provide a simplified and improved testing device of this general type.

Another object is to provide a means to effect volumetric measurements.

Other objects and advantages will become apparent in the ensuing specification and appended drawing in which:

FIG. 1 is an axial sectional view of a testing device and system embodying my invention;

FIG. 2 is an axial sectional view in a plane at right angles to that of FIG. 1, the end portions of the device being shown in elevation;

FIG. 3 is a cross sectional view of the device taken on the line 3—3 of FIG. 1.

General Description

Referring now to the drawings and in particular to FIGS. 1 and 2, my invention is embodied in a system wherein gas under pressure is introduced into my improved testing unit A from a suitable pressurizing source through a pressure supply line B; the pressure of the charge of gas in the device, after being isolated from the source B, is imposed upon a pressure test line C leading from the discharge end of the device; and this pressure is communicated to the instrument D under test, and to a pressure gage E, both connected in parallel to the test line C. With the pressurized charge isolated from the source B, the testing device A is manipulated to adjust the pressure in the test line C until exactly the prescribed pressure is read on the gage E. The instrument D is then adjusted to respond correctly to the prescribed pressure. The pressurized charge is then released from the testing unit A and the instrument D is replaced by another instrument which is tested in a like manner.

Detailed Description of Testing Unit

Testing Unit A comprises a cylindrical housing 10 having a discharge end provided with a counterbore 11 in which is received the reduced cylindrical body 12 of an end cap 13 which has a peripheral flange 14 provided with a series of apertures receiving respective cap screws 15 threaded into the counterbored end portion of cylinder 10 to secure the cap 13 in place. An O-ring 16, seated in a peripheral groove in the cylindrical body 12 of the cap 13, is compressively seated against the internal wall of counterbore 11 to provide a gas-tight seal. Test line C includes a connecting part 17 which has a pipe thread sealed in an internally threaded end portion of an outlet port 18 in the end cap 13.

At the opposite end of the housing 10 is a reduced neck 20 of frusto-conical form terminating in a gland collar 21 which has a central bore 22, an intermediate counterbore 23, and an outer counterbore 24. A screw actuator shaft 30 is rotatably fitted in the bore 22 and has an enlarged cylindrical integral flange 31 rotatably fitted in counterbore 23 and an integral coaxial stem 32 projecting outwardly therefrom. Stem 32 is rotatably fitted in and projects outwardly through a central cylindrical bore of a gland cap 33 which is fitted in the outer counterbore 24. Cap screws 34 are extended through apertures in gland cap 33 and are threaded into the collar 21 to secure the cap 33 in place.

An O-ring seal 35, disposed in an annular peripheral groove in actuator shaft 30, is compressively sealed against the cylindrical internal wall of bore 22 to provide a gas-tight pressure seal of the shaft 30 in the collar 21. Secured to the end of shaft stem 32 which projects outwardly beyond cap 33 is an actuator knob 36 for manual rotation of the actuator shaft 30.

Shaft 30 further includes an integral screw 40 projecting toward the discharge end of housing 10 along the axis thereof, into a tubular piston stem 41 which has as its rear end an integral nut portion 42 provided with an internal thread through which the screw 40 is threaded. The forward end of tubular stem 41 is firmly secured in the center of a piston 45, as by means of a male thread on said forward end, threaded into an internally threaded socket 46 in the piston 45, the socket 46 being closed by a bottom web 47 of the piston 45. In a cylindrical peripheral groove 48 in the piston 45 is seated an O-ring seal 49, under compression between the bottom of the groove 48 and the cylindrical wall of a bore 50 in the outlet end of the housing 10.

A frusto-conical inlet chamber 55 is defined within the tapering neck portion 20 of the inlet end of housing 10, its respective ends being defined by the internal end wall of collar 21 and the rear face of piston 45. A control chamber 57, in which the pressure of a trapped charge of gas is adjusted, is defined between the forward face of piston 45 and the internal face of rear end cap 13. Control chamber 57 communicates directly with test line C through the outlet port 18.

At this point it may be noted that by rotating the knob 36 to drive the screw 40 in a forward direction, the nut 42 may be caused to travel forwardly on screw 40, advancing the piston 45 to reduce the volume of chamber 57, thereby increasing the pressure of gas trapped therein. Reverse rotation of the knob 36 will return the piston 45 to the starting position shown in FIG. 1, in which the outer end of nut 42 abuts an annular shoulder 43 defined between screw 40 and the body of shaft 30.

In the inlet end portion 36 of housing 10 are a series of bosses 60 in which are respective radial ports 61, 62 (FIG. 2) and 63 (FIG. 1) the outer ends of which may be internally threaded with a pipe thread to receive respective fittings. To the port 61 is connected a valve 65 controlling the communication between the pressure source (so designated in FIG. 2) and the inlet chamber 55. To the port 62 is connected an outlet valve 66 for releasing the pressurized gas from chamber 55 at the end of a testing operation. To the port 63 is connected a fitting or line 67 providing communication between the chamber 55 and a pressure gage 68 which may be utilized for reading the pressure of the pressure source when in communication with inlet chamber 55. This port may also be used to connect to a vacuum source.

In a fourth boss 60 there is provided a bore 70 extending parallel to the major axis of housing 10 and in axial alignment with a passage 71 extending therefrom to the outlet end of the housing 10, where it opens into a shallow annular port 72 defined, in a radial plane, between the inner face of the rear end cap 13 and the bottom of counterbore 11. Bore 70 is connected to passage 71 by a valve seat 73 which may be frusto-conical as shown, and is connected to inlet chamber 55 by a radial port 74. A needle valve 75, disposed in bore 70, has a closure gasket 76 (e.g. of Neoprene or equivalent yielding material) secured to its forward end and adapted to be sealed against the valve seat 73. Valve 75 has a reduced neck portion 77 connecting it to an integral screw portion 78 which is threaded into an internally threaded counterbore 79 at the rear end of bore 70. An integral stem 80 is extended from screw 78 and has an actuator knob 81 secured to its end portion. Reduced neck 77 defines the bottom of annular groove in which an O-ring 82 is sealed under compression between the neck 77 and the internal wall of counterbore 70, thus sealing the valve stem 80 in the boss 60.

*Operation*

The needle valve 75 functions to control communication between radial port 74 and axial passage 71 through the valve bore 70, thus establishing and breaking communication between the inlet chamber 55 and the control chamber 57.

In the operation of the testing system disclosed in FIGS. 1 and 2, as an initial step the needle valve 75 is closed to cut off the communication between the two chambers. A test unit D may then be hooked up to the test line C. Needle valve 75 is then opened to establish communication between the inlet chamber 55 and control chamber 57. Should the valve 66 be open following a scavenging operation at the end of a previous test cycle, it is closed to seal the chamber 55 from atmosphere. Inlet valve 65 is then opened to deliver a charge of pressurized gas from the pressure source through the delivery line B into the inlet chamber 55 from which it will travel past the needle valve 75 through the control chamber 57 and through port 74, passage 71 and clearance space 72 into control chamber 57. Normally the pressure delivered by the pressure source will be slightly lower than the required pressure to which the unit D is to respond. After the source pressure is established in the control chamber 57, the needle valve 75 is closed so as to trap the pressurized gas in that chamber. Valve 65 may then be closed to cut off the unit A from the pressure source. Knob 36 is then rotated to advance the piston 45, adding compression to the gas in control chamber 57 while the operator observes the pressure gage D until the exact prescribed pressure is attained. At this point the unit D is adjusted for the proper response to this prescribed pressure. When such adjustment has been completed, the needle valve 75 is opened to reestablish communication between control chamber 57 and inlet chamber 55; and the exhaust valve 66 is opened to vent the chambers 55 and 57 to atmosphere. The test unit B is then disconnected from the test line C and another unit to be tested is connected to the line. Piston 45 is retracted to its starting position, the exhaust valve 66 is closed, the needle valve 75 is left open, and pressure from the source is then admitted to chamber 55 through valve 65, initiating another cycle of test operation.

In the operation of the actuator 40, 42, the compression in O-ring 49 establishes adequate frictional engagement with the bottom of the piston groove 48 and with the internal wall of bore 50 so as to hold the piston 47 against rotation. (An anti rotation device may be necessary when differential pressure becomes excessive.) The tubular stem 41 is secured to the piston 47 sufficiently firmly so that it will be held against rotation by its connection to the piston. The screw 40 may then be rotated within the stem 41 without causing the stem or the piston to rotate within housing 10, thus providing the screw-actuator action which moves the piston 45 axially in the bore 50.

I claim:
1. Apparatus for accurately establishing a required gas pressure for testing purposes, comprising: a cylindrical housing having a discharge end portion provided with a cylindrical bore and having an inlet end portion provided with a packing gland neck; an end cap secured to said discharge end portion of the housing and closing said bore, said cap having a discharge port for connection to a test unit and gage; a piston slidable in said bore in opposed relation to said end cap so as to define in said bore a control chamber in which the pressure of a trapped gas may be adjusted by axial movement of said piston so as to adjust the pressure in said control chamber accurately to the required pressure to be applied to said test unit; an actuator comprising a shaft journalled in said gland neck, a knob on the outer end of said shaft, a screw on the inner end of said shaft and a tubular piston stem having a forward end firmly secured to said piston and an internally threaded rear end portion constituting a follower nut through which said screw is threaded; said piston having a peripheral groove and a yieldable seal ring in said groove under compression between the bottom of the groove and the wall of said bore, said seal ring providing a frictional holding connection between said piston and said bore wall such as to resist the transmission of rotation to said piston from said screw; said inlet end portion of said housing providing an annular inlet chamber around said piston stem between said piston and said packing gland neck; controllable means for introducing pressurized gas into said inlet chamber; valve controlled passage means for transferring said pressurized gas from said inlet chamber to said control chamber and trapping it in said control chamber; and controllable means for releasing the compressed gas from said inlet chamber at the end of a testing operation, said housing, at its outlet end, having a counterbore and said end cap having a body portion received in said counterbore but spaced from the bottom thereof to provide an annular transfer port; said transfer means comprising an axial transfer passage extending in the wall of said housing parallel to its major axis and communicating with said annular transfer port at one end, and a manually operable valve providing communication between the other end of said transfer passage and said inlet chamber.

2. Apparatus as defined in claim 1, wherein said last mentioned valve is in the form of a needle valve aligned with said transfer passage.

References Cited by the Examiner
UNITED STATES PATENTS
3,069,891 12/62 Buckman _____ 73—4
3,106,084 10/63 Hoffman et al. _____ 73—4

FOREIGN PATENTS
5,634 A.D./86 Great Britain.
649,344 8/28 France.

ISAAC LISANN, *Primary Examiner.*